United States Patent

Seki et al.

[11] Patent Number: 5,493,193
[45] Date of Patent: Feb. 20, 1996

[54] NUMERICAL CONTROL APPARATUS AND NUMERICAL CONTROL METHOD

[75] Inventors: Masaki Seki, Tokyo; Masako Sudo, Tsukuba, both of Japan

[73] Assignee: Fanuc Ltd., Yamanashi, Japan

[21] Appl. No.: 244,562

[22] PCT Filed: Oct. 1, 1993

[86] PCT No.: PCT/JP93/01415

§ 371 Date: May 31, 1994

§ 102(e) Date: May 31, 1994

[87] PCT Pub. No.: WO94/09420

PCT Pub. Date: Apr. 28, 1994

[30] Foreign Application Priority Data

Oct. 12, 1992 [JP] Japan .................. 4-272889
Oct. 12, 1992 [JP] Japan .................. 4-272890
Oct. 12, 1992 [JP] Japan .................. 4-272891

[51] Int. Cl.$^6$ ............... G05B 19/409; G05B 19/4155
[52] U.S. Cl. ............... 318/573; 318/570; 364/474.31
[58] Field of Search ................ 318/567, 568.1, 318/569, 570, 573, 574; 364/474.01, 474.22, 474.23, 474.25, 474.26, 474.28, 474.31

[56] References Cited

U.S. PATENT DOCUMENTS

| | | |
|---|---|---|
| 3,783,253 | 1/1974 | Anderson et al. . |
| 4,521,860 | 6/1985 | Kanematsu et al. .................. 364/474 |
| 4,608,463 | 8/1986 | Breitenstein et al. . |
| 4,891,763 | 1/1990 | Kuriyama ................ 364/474.25 |
| 4,912,625 | 3/1990 | Glatfelter ................ 364/474.22 |
| 5,023,800 | 6/1991 | Carver et al. ................ 364/474.24 |

FOREIGN PATENT DOCUMENTS

| | | |
|---|---|---|
| 63606 | 11/1982 | European Pat. Off. . |
| 59-160303 | 10/1984 | Japan . |
| 61-193205 | 8/1986 | Japan . |
| 63-709 | 1/1988 | Japan . |
| 63-113606 | 5/1988 | Japan . |
| 63-269203 | 11/1988 | Japan . |
| 64-14615 | 1/1989 | Japan . |
| 1-158506 | 6/1989 | Japan . |
| 2054199 | 2/1981 | United Kingdom . |
| 2216287 | 10/1989 | United Kingdom . |
| 1369194 | 10/1994 | United Kingdom . |

Primary Examiner—Bentsu Ro
Attorney, Agent, or Firm—Staas & Halsey

[57] ABSTRACT

A numerical control apparatus for controlling a machine tool to simply and accurately cyclically machine a workpiece. When the operator enters graphic data such as circular or rectangular graphic data in an interactive fashion from a keyboard or the like according to guidance information displayed on a display unit, a graphic data memory device stores the entered graphic data. A converting device calculates a machining path for cyclically machining a workpiece based on the graphic data and converts the machining path into NC commands, which are then stored in an NC command memory device. An interpolating device outputs an interpolated pulse signal to move the machine tool along the cyclic machining path based on a pulse signal from a manual pulse generator or a jog feed button on a machine control console. By freely operating the machine control console, the operator can easily and accurately effect cyclic machining on a workpiece while confirming a machined status.

3 Claims, 12 Drawing Sheets

FIG. 7

NUMERICAL CONTROL APPARATUS AND NUMERICAL CONTROL METHOD

BACKGROUND OF THE INVENTION

1. Field of the Invention

The present invention relates to a numerical control apparatus and a numerical control method for controlling a machine tool, and more particularly to a numerical control apparatus and a numerical control method for controlling a machine tool which machines prototypes or the like.

2. Background Art

Advances in the technology of numerically controlled machine tools have been so great that they can machine workpieces of complex shape at high speed with precision. At present, workpieces of complex shape cannot be machined without numerically controlled machine tools.

To generate machining programs, there are widely used interactive numerical control apparatus which comprise a numerical control apparatus with an interactive program generating function, and automatic programming apparatus for simply generating complex machining programs.

In the use of such numerical control apparatus, it is necessary to accurately define machine coordinates, a machine origin, program coordinates, a machining origin, and other data for generating strict machining programs. The interactive numerical control apparatus and the automatic programming apparatus can be used to machine a number of workpieces.

For some machining processes for producing a prototype or a model, general-purpose milling machines, lathes, and the like are used which require a short period of time to carry out preparatory action such as attachment and detachment of workpieces, installation of tools, etc., and does not require machining programs to be generated. Machining on such machines or lathes has been carried out solely at the discretion of the operator.

Problems of general-purpose machine tools are that the number of available operators who can handle general-purpose machine tools is becoming smaller, and it is difficult for the general-purpose machine tools to carry out oblique linear machining, arcuate machining, or the like though they can effect linear machining without any problem.

If, on the other hand, a general numerically controlled machine tool is used to machine a prototype or a model, then it is necessary to accurately define machine coordinates, a machine origin, program coordinates, a machining origin, and other data. While it is not impossible to define those data, the required programming process is too time-consuming and troublesome for machining a portion of a single workpiece.

To solve the above problems, the applicant has filed Japanese patent application No. 4-231836 on a numerical control apparatus which employs a general-purpose machine tool for carrying out simple machining processes to machine prototypes or the like.

Such a numerical control apparatus is widely used for machining a portion of a workpiece. Where a workpiece is to be machined into a relatively simple shape, the operator may want to machine the workpiece to its final shape. With the above numerical control apparatus, however, the operator himself is required to calculate all machining cycles and operate the tools, resulting in a time-consuming and tedious working process. Conversely, if a general numerical control apparatus is used, then since it is necessary to define machine coordinates, a machine origin, program coordinates, a machining origin, and other data, it is too time-consuming and tedious to machine only one workpiece on the general-purpose numerical control apparatus.

One frequent machining process performed when a prototype is to be produced by a machine tool is drilling. According to one drilling process, a workpiece is drilled at a group of points along a certain path on the workpiece. In such a drilling process, after a hole is formed at a certain point with a drilling machine, it is necessary to set and position the drill for a next hole. Accordingly, the drilling process has been complex, and it has been time-consuming to form holes at many points. The drill has not necessarily been positioned accurately as it has been positioned based on eye measurement. In view of the above background, there has been a demand for drilling a workpiece simply and accurately at a group of points thereon using the functions of a numerical control apparatus incorporated in a machine tool.

In the above numerical control apparatus, it has been customary to generate a designated shape based on the information which has been entered according to guidance information, and feed a tool along the designated shape by operating a manual pulse generator or the like when a workpiece is machined. The designated shape is only a portion, e.g., a linear portion or a corner portion, of an entire machining shape. Therefore, even when the workpiece is to be machined for the entire machining shape, it can only be machined from portion to portion in the entire machining shape, and cannot continuously be machined for the entire machining shape. Furthermore, when a plurality of workpieces are to be machined to the same shape, they have to be machined one by one because the entire machining shape for them is not recognized.

SUMMARY OF THE INVENTION

In view of the above problems, it is an object of the present invention to be able to effect cyclic machining simply and accurately using the functions of a numerical control apparatus incorporated in a machine tool.

Another object of the present invention is to provide a numerical control apparatus capable of drilling a workpiece simply and accurately at a group of points.

Still another object of the present invention is to provide a numerical control method capable of machining a workpiece continuously for an entire machining shape when the workpiece is machined along a designated shape by operating a manual pulse generator or the like.

To achieve the above objects, there is provided in accordance with the present invention a numerical control apparatus for controlling a machine tool having at least two axes, comprising graphic data memory means for storing graphic data for cyclic machining entered in an interactive fashion according to guidance information, converting means for calculating a machining path for cyclically machining a workpiece based on said graphic data and converting said machining path into NC commands, NC command memory means for storing said NC commands, movement command means for outputting a pulse signal to command movement of a tool, and interpolating means for outputting an interpolated pulse signal to move said tool along said machining path based on the pulse signal outputted from said movement command means.

When the operator enters graphic data such as circular or rectangular graphic data in an interactive fashion from a keyboard or the like according to guidance information displayed on a display unit, the graphic data memory means stores the entered graphic data.

The converting means calculates a machining path for cyclically machining a workpiece based on the graphic data and converts the machining path into NC commands, and the NC command memory means stores the NC commands. The movement command means outputs a pulse signal for commanding movement of the tool. The pulse signal is outputted depending on the operation of the operator.

The interpolating means outputs an interpolated pulse signal to move the tool along the cyclic machining path based on the pulse signal from the movement command means.

Therefore, by freely operating the movement command means, the operator can easily and accurately effect cyclic machining on a workpiece while confirming a machined status.

BRIEF DESCRIPTION OF THE DRAWINGS

FIG. 7 is a view showing a guidance selection screen display image for selecting a point group pattern;

DETAILED DESCRIPTION OF THE PREFERRED EMBODIMENTS

An embodiment of the present invention will hereinafter be described below with reference to the drawings.

Figure 1:
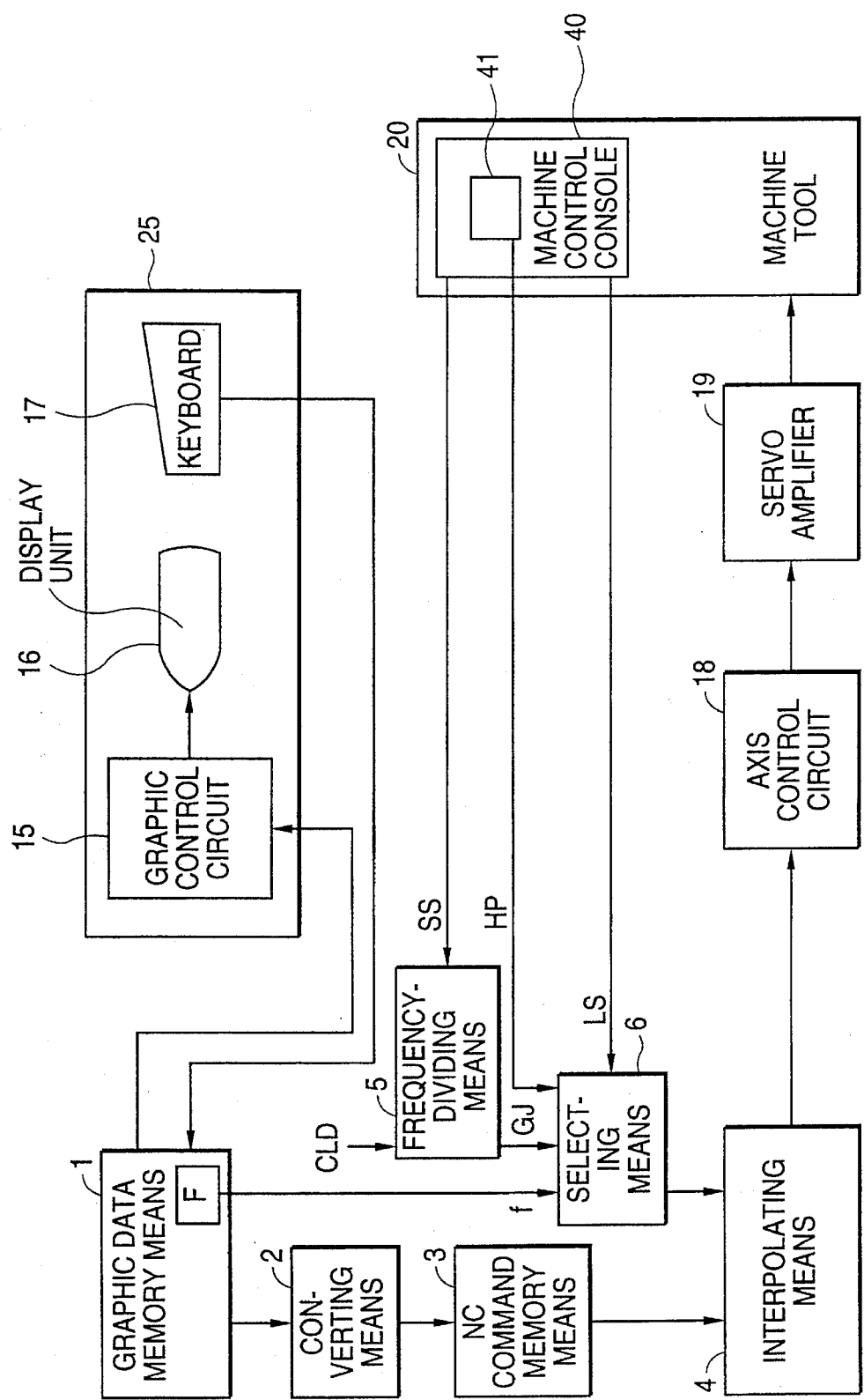
FIG. 1 is a schematic diagram of a numerical control apparatus according to a first embodiment of the present invention.

FIG. 1 schematically illustrates a numerical control apparatus according to a first embodiment of the present invention. The numerical control apparatus has a graphic data memory means 1 for displaying guidance information through a graphic control circuit 15 on a display unit 16, and storing graphic data that have been entered in an interactive fashion according to guidance information by the operator while operating a keyboard 17. The graphic data include command data such as a feed speed F. The stored graphic data are displayed, if necessary, on the display unit 16 through the graphic control circuit 15. A procedure for generating such graphic data will be described in detail later on.

The numerical control apparatus has a converting means 2 which calculates a machining path for cyclically machining a workpiece based on the graphic data and converts the machining path into NC commands, which are then stored in an NC command memory means 3.

The numerical control apparatus also has a selecting means 6 for selecting a pulse signal for commanding the speed at which a tool is to move. The selecting means 6 is supplied with a pulse signal HP from a manual pulse generator 41, a pulse signal GJ corresponding to the turning-on of a jog feed button on a machine control console 40, or a feed command pulse signal f. The feed command pulse signal f is a pulse signal depending on the feed speed command F that has been preset together with graphic data according to guidance information. In this embodiment, the feed command pulse signal f is generated by frequency-dividing a clock signal CLD from a clock circuit (not shown) based on the feed speed command F.

The pulse signal GJ that is produced when a jog feed button is turned on is generated as follows: A frequency-dividing means 5 is supplied with the clock signal CLD and a set signal SS from a setting switch on the machine control console 40. The frequency-dividing means 5 generates the pulse signal GJ by frequency-dividing the clock signal CLD with the set signal SS. The pulse signal GJ is sent to the selecting means 6 depending on the turning-on signal from the jog feed button.

The selecting means 6 is also supplied with, other than the above pulse signals, a selecting signal LS indicative of "MANUAL" or "AUTOMATIC" selected by an operation changing switch (FIG. 3), described later on, on the machine control console 40.

If the selecting signal from the operation changing switch (FIG. 3) indicates "MANUAL", then the selecting means 6 sends either one of the pulse signal transmitted by manual operation, i.e., the pulse signals HP from the manual pulse generator 41, and the pulse signal GJ from the jog feed button (FIG. 3), described later on, to an interpolating means 4. If the selecting signal from the operation changing switch indicates "AUTOMATIC", then the selecting means 6 sends the feed command pulse signal f depending on the feed speed command F to the interpolating means 4 after confirming that a cycle start button on the machine control console 40 has been pressed.

The interpolating means 4 interpolates the pulse signal transmitted from the selecting means 6, and outputs an interpolated pulse signal. Specifically, the interpolating means 4 generates an interpolated pulse signal for moving a tool along a cyclic machining path, and outputs the interpolated pulse signal to an axis control circuit 18, which actually comprises circuits for respective three axes. In response to the interpolated pulse signal from the interpolating means 4, the axis control circuit 18 generates speed commands for the respective axes, and sends the speed commands to a servoamplifier 19. The servoamplifier 19 energizes servomotors on a machine tool 20 to control the machine tool 20.

Figure 2:
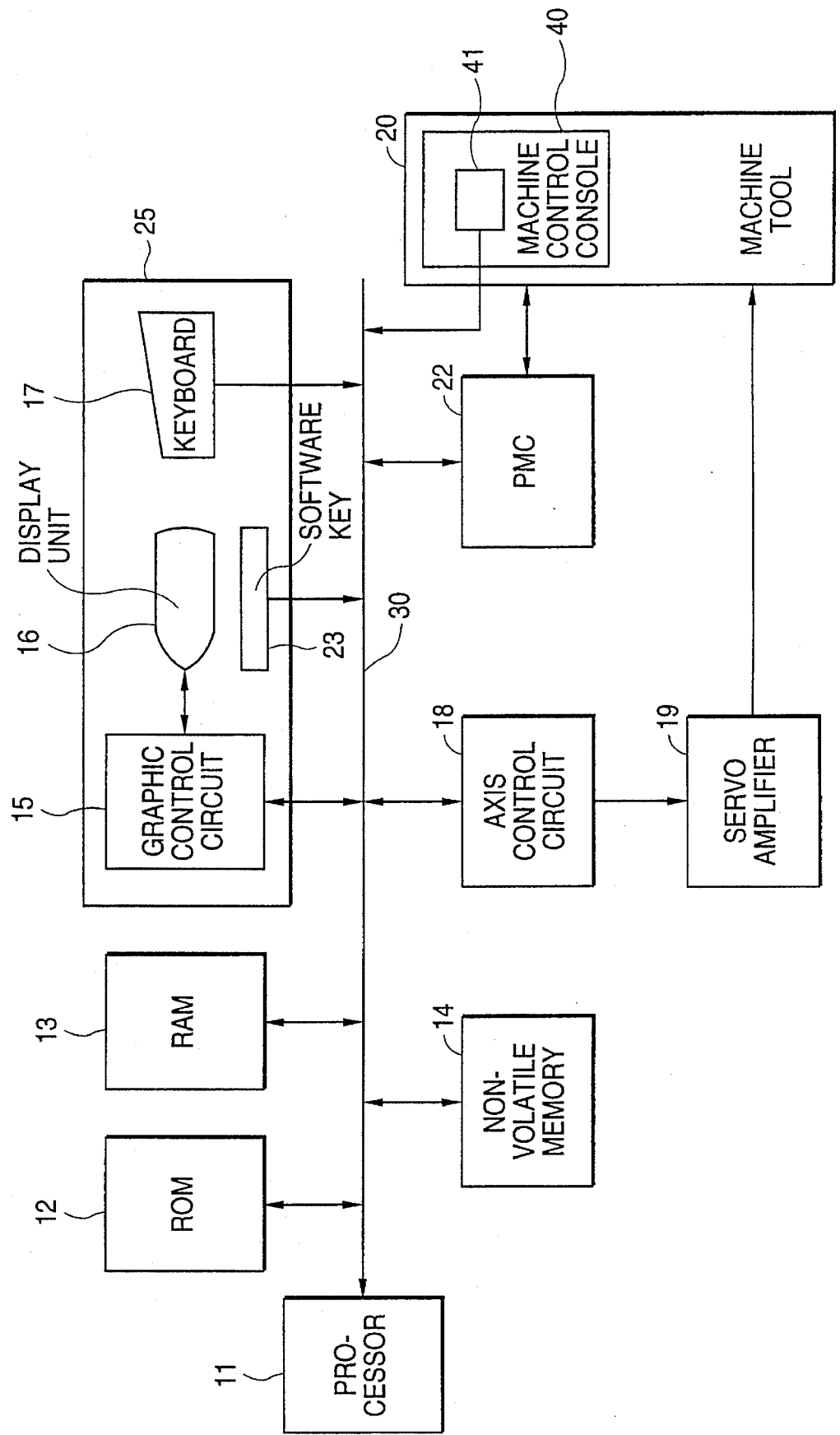
FIG. 2 is a block diagram of a hardware arrangement of the numerical control apparatus according to the first embodiment.

FIG. 2 is a block diagram of a hardware arrangement of the numerical control apparatus according to the first embodiment. A processor 11 controls the numerical control apparatus in its entirety according to a system program stored in a ROM 12. The graphic data memory means 1, the converting means 2, the NC command memory means 3, the interpolating means 4, the frequency-dividing means 5, and the selecting means 6 shown in FIG. 1 are software-implemented functions performed by the processor 11 according to the system program stored in the ROM 12. The ROM 12 comprises an EPROM or an EEPROM. A RAM 13, which comprises an SRAM or the like, stores temporary data such as input and output signals and the like. A nonvolatile memory 14 comprises a CMOS that is backed up by a battery (not shown). The nonvolatile memory 14 stores various data such as parameters, machining programs, etc. which are to be retained after the power supply is turned off.

The graphic control circuit 15 converts guidance information, entered graphic data and machining cycle, and the like into a displayable signal, and supplies the displayable signal to the display unit 16. The display unit 16 comprises a CRT or a liquid crystal display panel. The axis control circuit 18 (for three axes) receives axis movement commands including the interpolated pulse signal from the processor 11 and outputs the axis movement commands to the servoamplifier 19 (for three axes). In response to the axis movement commands, the servoamplifier 19 energizes the servomotors (not shown) on the machine tool 20. The machine tool 20 has, in addition to the servomotors, the machine control console 40 operable for entering movement commands as described in detail later on. These components are interconnected by a bus 30.

A PMC (programmable machine controller) 22 receives a T function signal (tool selection command) and the like through the bus 30 when a machine program is to be executed. The PMC processes the received signal according to a sequence program, and outputs a signal as an operation command to control the machine tool 20. In an interactive numerical control apparatus configuration, the PMC 22 receives a status signal from the machine tool 20, processes the received signal according to a sequence program, and transfers a required input signal to the processor 11 through the bus 30.

To the bus 30, there is also connected a software key 23 whose function varies depending on the system program. The software key 23, the display unit 16, and the keyboard 17 are mounted on a CRT/MDI panel 25.

Figure 3:
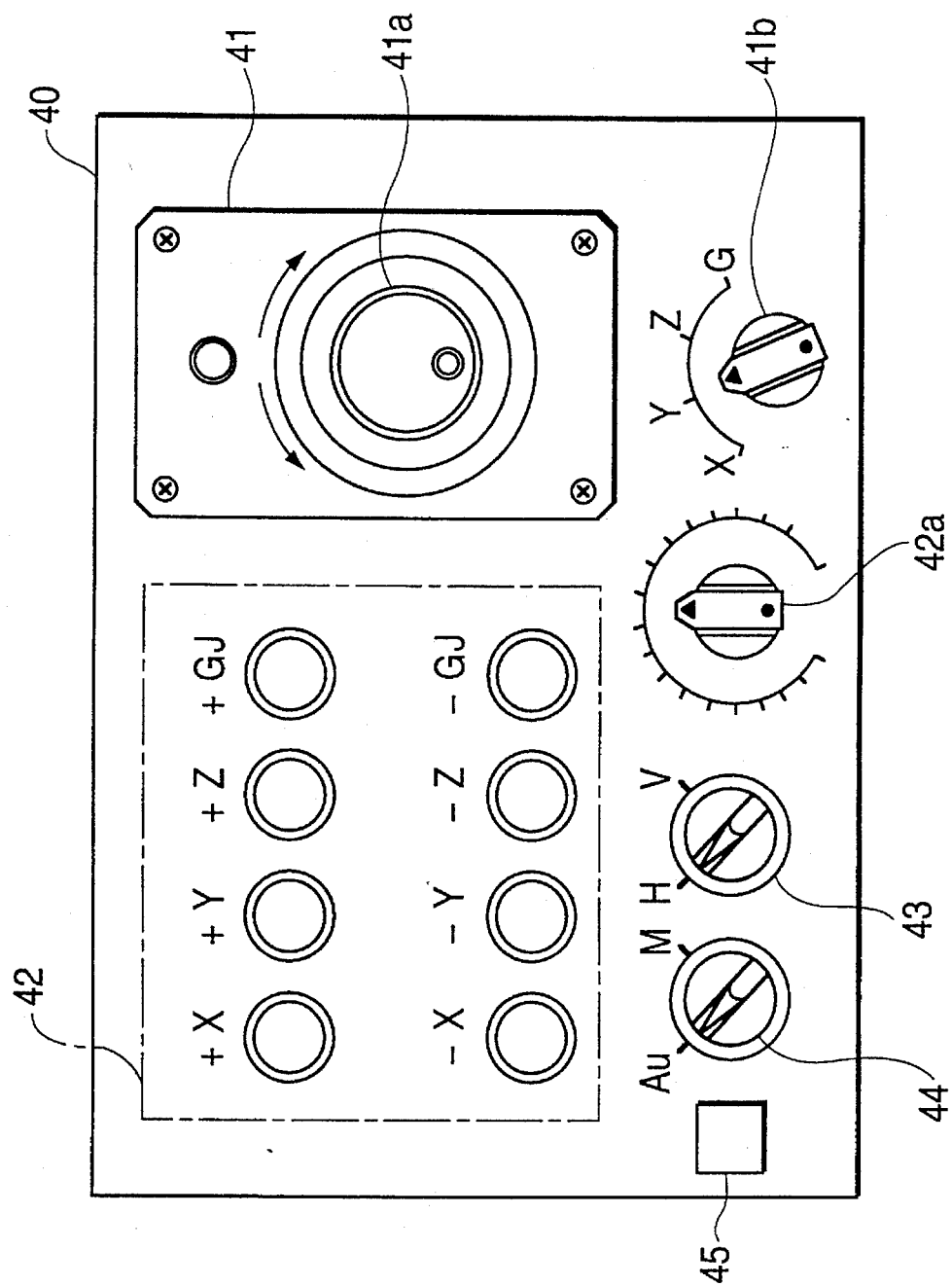
FIG. 3 is a view showing a machine control console by way of example.

FIG. 3 is a view showing the machine control console on the machine tool by way of example. The machine control console 40 shown in FIG. 3 has the manual pulse generator 41, a selector switch 41b, jog feed buttons 42, a setting switch 42a, a direction changing switch 43, an operation changing switch 44, and a cycle start button 45.

When a handle 41a is turned to the left or right, the manual pulse generator 41 generates a pulse signal depending on the rotation of the handle 41a. The pulse signal, which is composed of two-phase pulses for determining the direction in which the handle 41a is turned, is sent through the bus 30 to the processor 11 for moving the tool.

The selector switch 41b is a switch for selecting a pulse signal generated by the manual pulse generator 41 in either an X-axis direction (X), a Y-axis direction (Y), a Z-axis direction (Z), or a direction (G) which corresponds to the cyclic machining path in the graphic data.

The jog feed buttons 42 comprise a total of 8 buttons including positive and negative feed buttons "+X", "−X", "+Y", "−Y", "+Z" and "−Z" for the respective axes, and positive and negative feed buttons "+GJ", "−GJ" corresponding to the cyclic machining path in the graphic data. When the above tool movement is to be effected by operating a jog feed button 42, the feed button "+GJ" is used. A turning-on signal produced when this jog feed button 42 is pressed is sent through the PMC 22 and the bus 30 to the processor 11, and processed in a predetermined fashion.

The setting switch 42a sets the number of pulses in a certain period of time which are generated when the jog feed buttons 42 are pressed. As with the turning-on signal from the jog feed buttons 42, the set signal SS produced by the setting switch 42a is sent through the PMC 22 and the bus 30 to the processor 11, and processed by the frequency-dividing means 5.

The direction changing switch 43 is a switch for selecting whether the tool is to be moved parallel to a designated shape generated according to the guidance information or to be moved perpendicularly to the designated shape, when "G" is selected by the selector switch 41b and the manual pulse generator 41 is operated. When the direction changing switch 43 is set to "H", the tool moves parallel to the designated shape. When the direction changing switch 43 is set to "V", the tool moves perpendicularly to the designated shape.

The operation changing switch 44 is a switch for selecting whether the tool movement based on the graphic data is to be effected manually or automatically. When the operation changing switch 44 is set to "M", the tool moves manually. When the operation changing switch 44 is set to "Au", the tool moves automatically according to the feed speed command F.

The cycle start button 45 is a switch for starting an automatic feed while the operation changing switch 44 is being set to "Au". Specifically, when the cycle start button 45 is pressed at the time the tool is to be moved to a next machining position, the tool automatically carries out cyclic machining.

Now, a procedure for effecting cyclic machining based on a guidance function will be described below.

Figure 4:
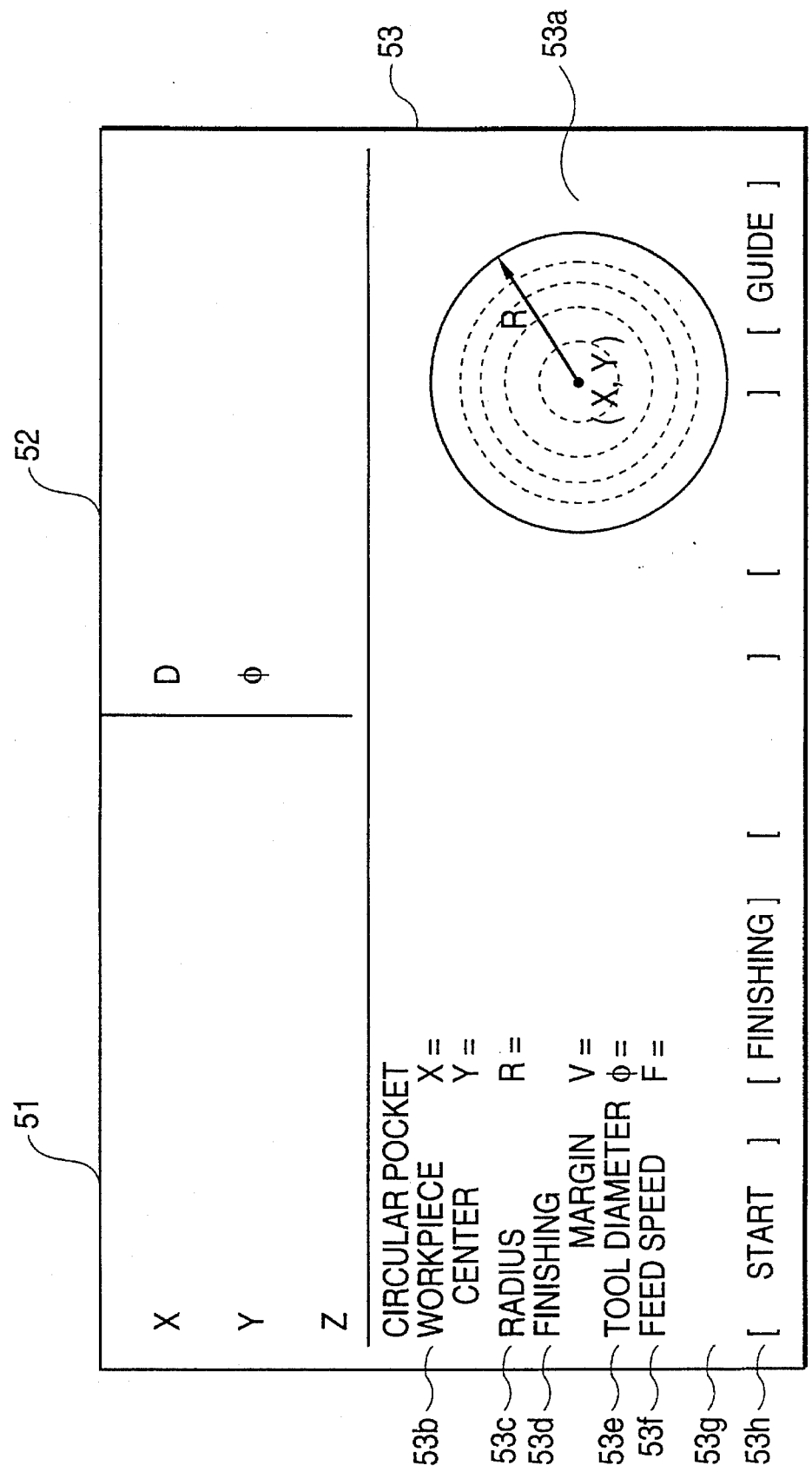
FIG. 4 is a view showing a graphic data entering screen display image for cyclically machining a circular pocket.

FIG. 4 is a view showing a graphic data entering screen display image for cyclically machining a circular pocket. The graphic data entering screen display image for cyclically machining a circular pocket is displayed on the display screen of the display unit 16. The graphic data entering screen display image includes a present position display column 51 in its upper left area for displaying the present position of the tool, a tool status display column 52 in its upper right area for displaying the current status and the like of the tool, and a data entering image 53 in its lower area for entering graphic data.

The present position display column 51 includes an X-coordinate column, a Y-coordinate column, and a Z-coordinate column as indicating the present position of the tool. The tool status display column 52 includes a distance display column for indicating the distance (D) between the tool and the designated shape, and a tool diameter display column for indicating the tool diameter ($\phi$).

The data entering image 53 displays in its right area a finished status diagram 53a for circular pocket cyclic machining. The finished status diagram 53a is determined by the elements of a circle center (X, Y), a radius R, a finishing margin V, a tool diameter $\phi$, and a feed speed F. The data entering image 53 displays in its left area a center (X, Y) entering column 53b, a radius entering column 53c, a finishing margin entering column 53d, a tool diameter entering column 53e, and a feed speed entering column 53f, which correspond respectively to the elements for determining the finished status diagram.

If the entered value for the radius R is positive, then the tool moves clockwise, and if the entered value for the radius R is negative, then the tool moves counterclockwise. The finishing margin V is a depth to which the tool cuts for finishing the workpiece. If no value is set for the finishing margin, V or 0 is set and, therefor, the workpiece is not finished. If the finishing margin V is of a positive value, then the workpiece is roughly machined to the designated shape plus the finishing margin. If the finishing margin V is of a negative value, then the workpiece is roughly machined to the designated shape minus the finishing margin.

In addition to the above data entering columns, the data entering image 53 displays a message display column 53g and a software key menu column 53h. When data in the data entering columns are entered, graphic data for circular pocket cyclic machining are generated, and stored in the graphic data memory means 1. Then, the message display column 53g displays a flickering message "PRESS [START]". When the operator presses a function key on the keyboard 17 which corresponds to [START] in the software key menu column 53h according to the displayed message, the tool automatically moves to the central position of the pocket, and a cyclic machining process based on the guidance function is started.

Figure 5:
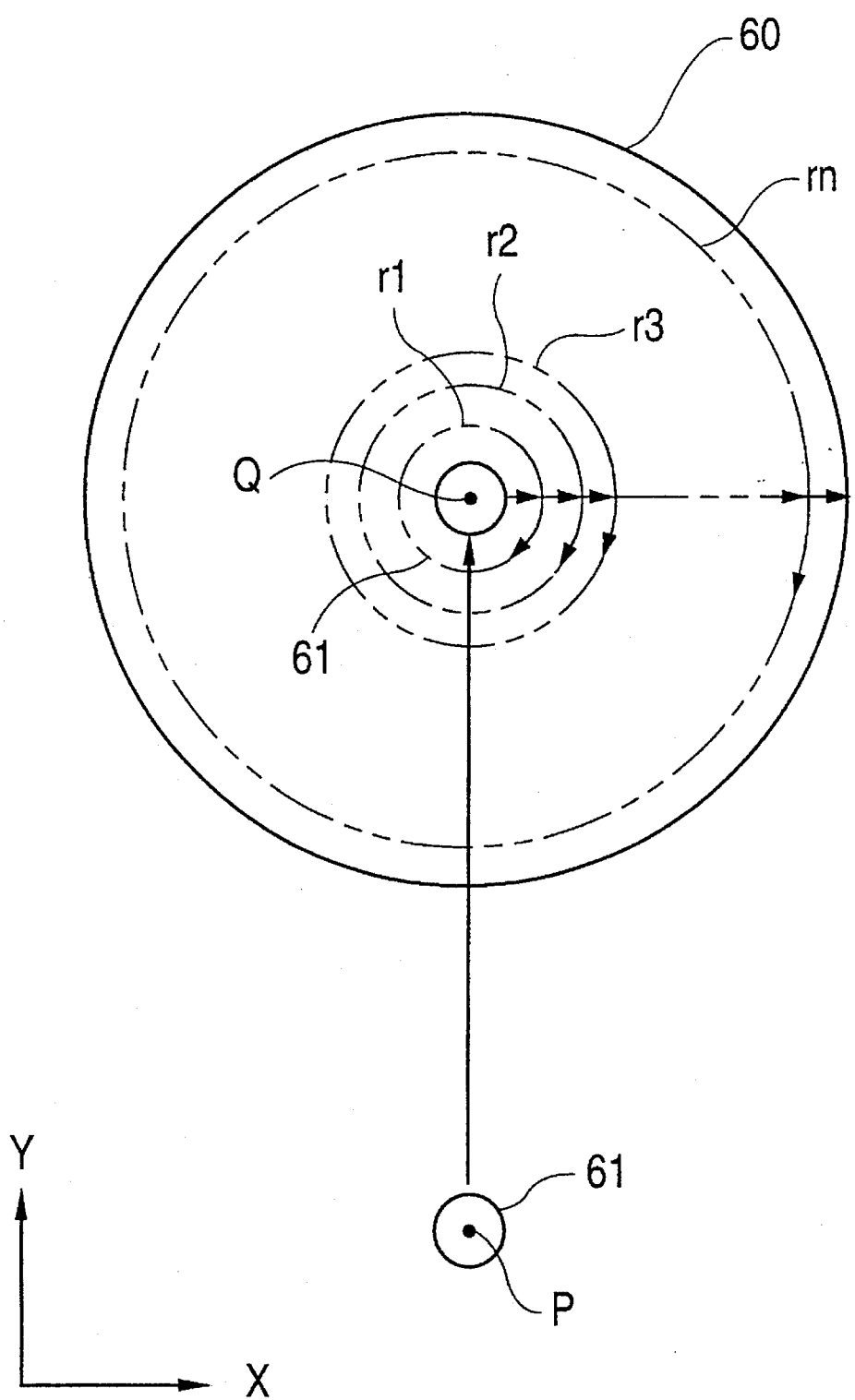
FIG. 5 is a diagram illustrative of a specific procedure for cyclically machining a circular pocket.

FIG. 5 is a diagram illustrative of a specific procedure for cyclically machining a circular pocket. It is assumed that a tool 61 is first in the position of a point P and is to cyclically machine a workpiece to a designated shape 60 at a pocket central position Q, and that a preparatory hole has already been formed at the pocket central position Q. When the operator presses [START] in the software key menu column 53h, the tool 61 automatically moves from the position of the point P to the pocket central position Q.

After the tool movement is completed, the operator operates the handle 41a and the jog feed button (GJ) 42 to start the pocket machining process. The tool 61 first cuts the workpiece by a width in the X-axis direction from the pocket central position Q. Then, the tool 61 cuts the workpiece along a circle r1. When the cutting along the circle r1 is finished, the tool 61 cuts the workpiece successively along circles r2, r3, rn. When the cutting up to the designated shape 60 is finished, the tool 61 automatically moves to the pocket central position Q and stops.

In the cyclic machining process, when the handle 41a is used, the selector switch 41b on the machine control console 40 is set to "G", the operation changing switch 44 is set to "M", the direction changing switch 43 is set to "H", and the handle 41a is turned to the right. The tool 61 moves at a speed proportional to the speed at which the handle 41a is turned. When the handle 41a is turned to the left, the tool 61 moves back along the cut path.

When the jog feed buttons 42 are used, the selector switch 41b is set to "G", the operation changing switch 44 is set to "M", the direction changing switch 43 is set to "H", and the jog feed button 42 "+GJ" is pressed. As long as the jog feed button 42 "+GJ" is pressed, the tool 61 moves at a feed speed set by the setting switch 42a. When the jog feed button 42 "−GJ" is pressed, the tool 61 moves back along the cut path.

In this embodiment, automatic feeding can be carried out other than using the handle 41a and the jog feed buttons 42. To effect such automatic feeding, the operation changing switch 44 is set to "Au", the direction changing switch 43 is set to "H", and the cycle start button 45 is pressed. The tool 61 now moves at a feed speed F entered on the screen display image shown in FIG. 4, and automatically effects cyclic machining.

Whether the tool 61 is moved either manually by the handle 41a or the jog feed buttons 42 or automatically can be selected even while the tool 61 is moving. For example, if the operator wants to switch to automatic feeding while the tool 61 is being moved by the handle 41a, then the operator may shift the operation changing switch 44 from "M" to "Au", and the tool movement immediately switches to automatic feeding. Switching from the tool movement using the jog feed buttons 42 to automatic feeding or vice versa can be effected simply by shifting the operation changing switch 44.

As described above, since the designated shape 60 is entered and the tool 61 is controlled for cyclic machining by a desired feeding operation, the operator can easily and accurately machine the workpiece cyclically while confirming the machined status.

In the above embodiment, the machining of a workpiece to form a circular pocket has been described. However, the present invention is also applicable to other machining processes, e.g., other pocket machining to form a rectangular pocket, a track pocket, or the like, or other shape machining to form a planar surface, a side surface, or the like.

While the above embodiment has been described with respect to a milling machine, the present invention is also applicable to other machine tools such as a lathe or the like.

The above guidance function may be incorporated in an ordinary numerical control apparatus, or may be arranged as an especially inexpensive numerical control apparatus.

According to the first embodiment, as described above, the tool is moved along a cyclic machining path depending on the output of a pulse signal from a movement command means. Therefore, when the operator freely operates the movement command means, the operator can easily and accurately effect cyclic machining while confirming a machined status.

Functions for simply drilling a workpiece at a group of points will be described below. The hardware (FIG. 2) of a numerical control apparatus and a machine control console (FIG. 3) for performing such functions are the same as those of the first embodiment.

Figure 6:
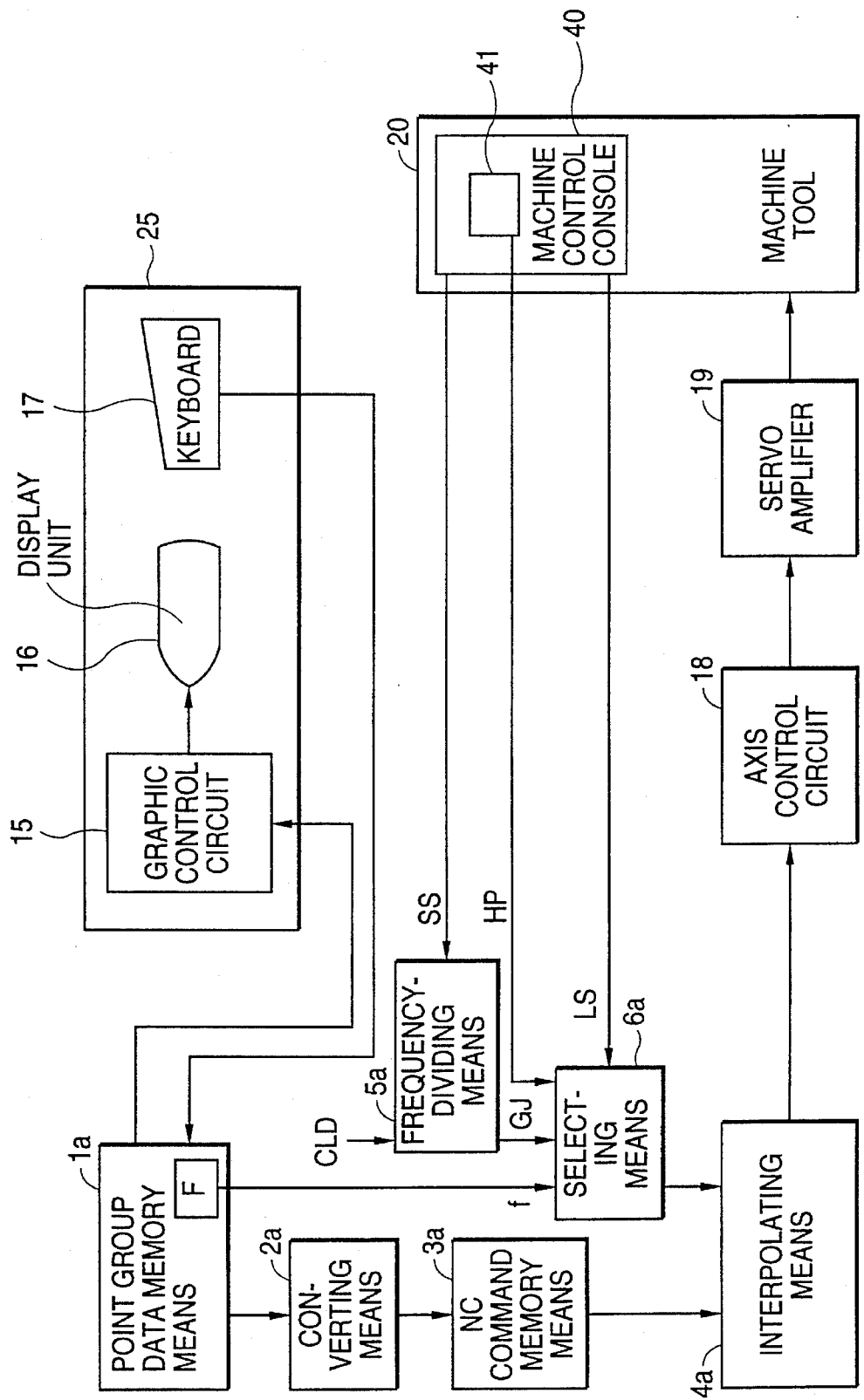
FIG. 6 is a schematic diagram of a numerical control apparatus according to a second embodiment of the present invention.

FIG. 6 is a schematic diagram of a numerical control apparatus according to a second embodiment of the present invention. The numerical control apparatus includes a point group data memory means 1a for displaying guidance information through a graphic control circuit 15 on a display unit 16, and storing point group data that have been entered in an interactive fashion according to guidance information by the operator while operating a keyboard 17. The stored point group data are displayed, if necessary, on the display unit 16 through the graphic control circuit 15. A procedure for generating such point group data will be described in detail later on.

The numerical control apparatus has a converting means 2a which converts the point group data into NC commands, which are then stored in an NC command memory means 3a.

The numerical control apparatus also has a selecting means 6a for selecting a pulse signal for commanding the speed at which a tool is to move. The selecting means 6a is supplied with a pulse signal HP from a manual pulse generator 41, a pulse signal GJ corresponding to the turning-on of a jog feed button 42 (FIG. 3) on a machine control console 40, or a feed command pulse signal f. The feed command pulse signal f is a pulse signal depending on the feed speed command F that has been preset together with point group data according to guidance information. In this embodiment, the feed command pulse signal f is generated by frequency-dividing a clock signal CLD from a clock circuit (not shown) based on the feed speed command F.

The pulse signal GJ that is produced when a jog feed button 42 is turned on is generated as follows: A frequency-dividing means 5a is supplied with the clock signal CLD and a set signal SS from the setting switch 42a (FIG. 3) on the machine control console 40. The frequency-dividing means 5 generates the pulse signal GJ by frequency-dividing the clock signal CLD with the set signal SS. The pulse signal GJ is sent to the selecting means 6a depending on the turning-on signal from the jog feed button 42. The jog feed button 42 turned on at this time is a feed button "+GJ" (FIG. 3) for feeding the tool along a designated path.

The selecting means 6a is also supplied with, other than the above pulse signals, a selecting signal LS indicative of "MANUAL" or "AUTOMATIC" selected by the operation changing switch 44 (FIG. 3) on the machine control console 40.

If the selecting signal from the operation changing switch 44 indicates "MANUAL", then the selecting means 6a sends either one of the pulse signals transmitted by manual operation, i.e., the pulse signal HP from the manual pulse generator 41 or the pulse signal GJ from the jog feed button 42, to an interpolating means 4a. If the selecting signal from the operation changing switch 44 indicates "AUTOMATIC", then the selecting means 6a sends the feed command pulse signal f depending on the feed speed command F to the interpolating means 4a after confirming that the cycle start button 45 (FIG. 3) on the machine control console 40 has been pressed.

The interpolating means 4a interpolates the pulse signal transmitted from the selecting means 6a, and outputs an interpolated pulse signal. Specifically, the interpolating means 4a generates an interpolated pulse signal for moving a tool to a next point designated by an NC command when the machining at one point of the point group data is completed, and outputs the interpolated pulse signal to an axis control circuit 18, which actually comprises circuits for respective three axes. In response to the interpolated pulse signal from the interpolating means 4a, the axis control circuit 18 generates speed commands for the respective axes, and sends the speed commands to a servoamplifier 19. The servoamplifier 19 energizes servomotors on a machine tool 20 to control the machine tool 20.

Now, a procedure for generating the point group data will be described below with reference to FIGS. 7 and 8.

Figure 7:
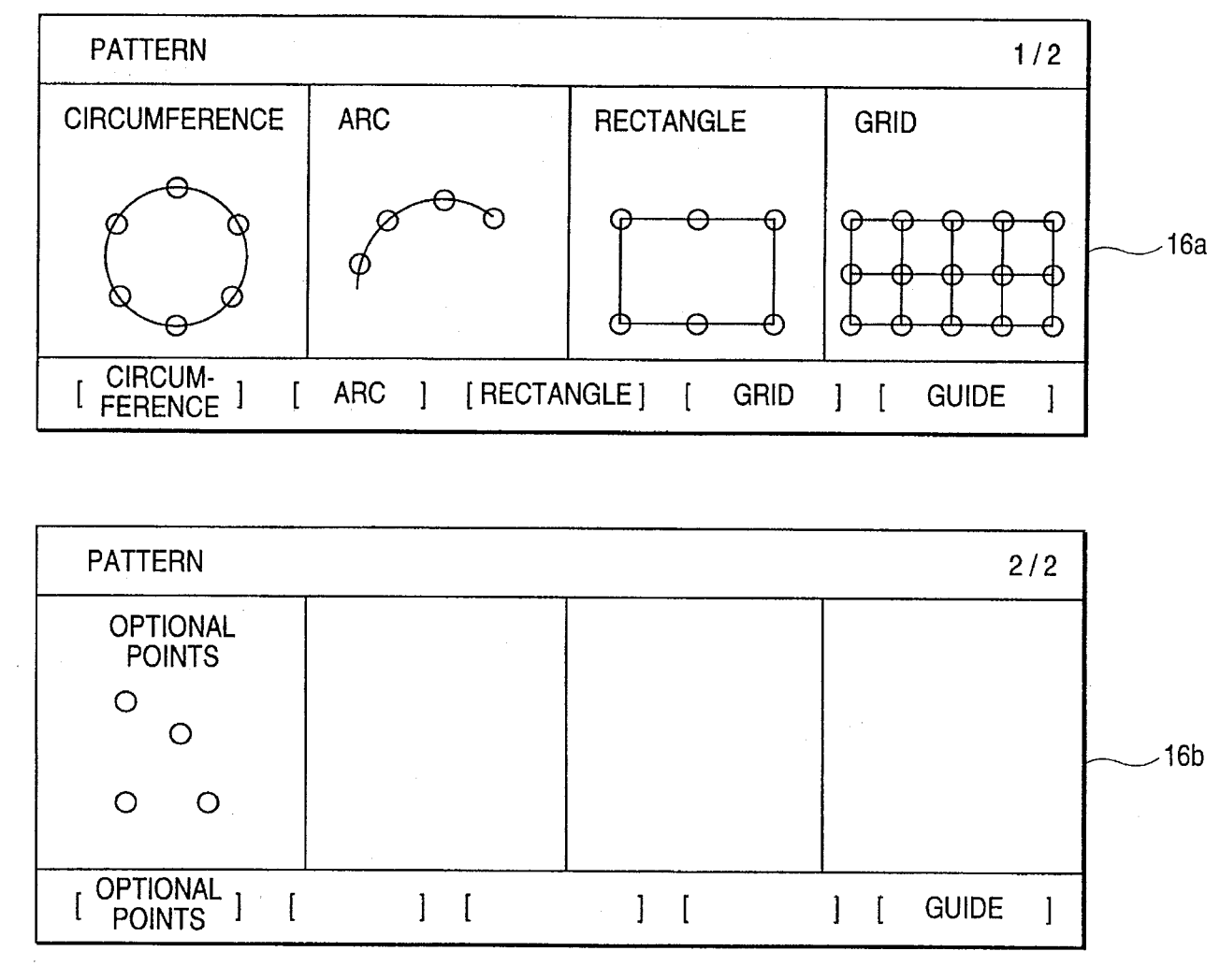

FIG. 7 is a view showing a guidance selection screen display image for selecting a point group pattern. The guidance selection screen display image 16a is displayed on the display unit 16. The guidance selection screen display image 16a first indicates four point group patterns as shown. The four group patterns include a point group pattern on a circumference, a point group pattern on an arc, a point group pattern on a rectangle, and a point group pattern on a grid. When a software key (not shown) is pressed, a next guidance selection screen display image 16b is displayed, indicating a point group pattern at optional points. The operator selects a required one of these five point group patterns.

Figure 8:
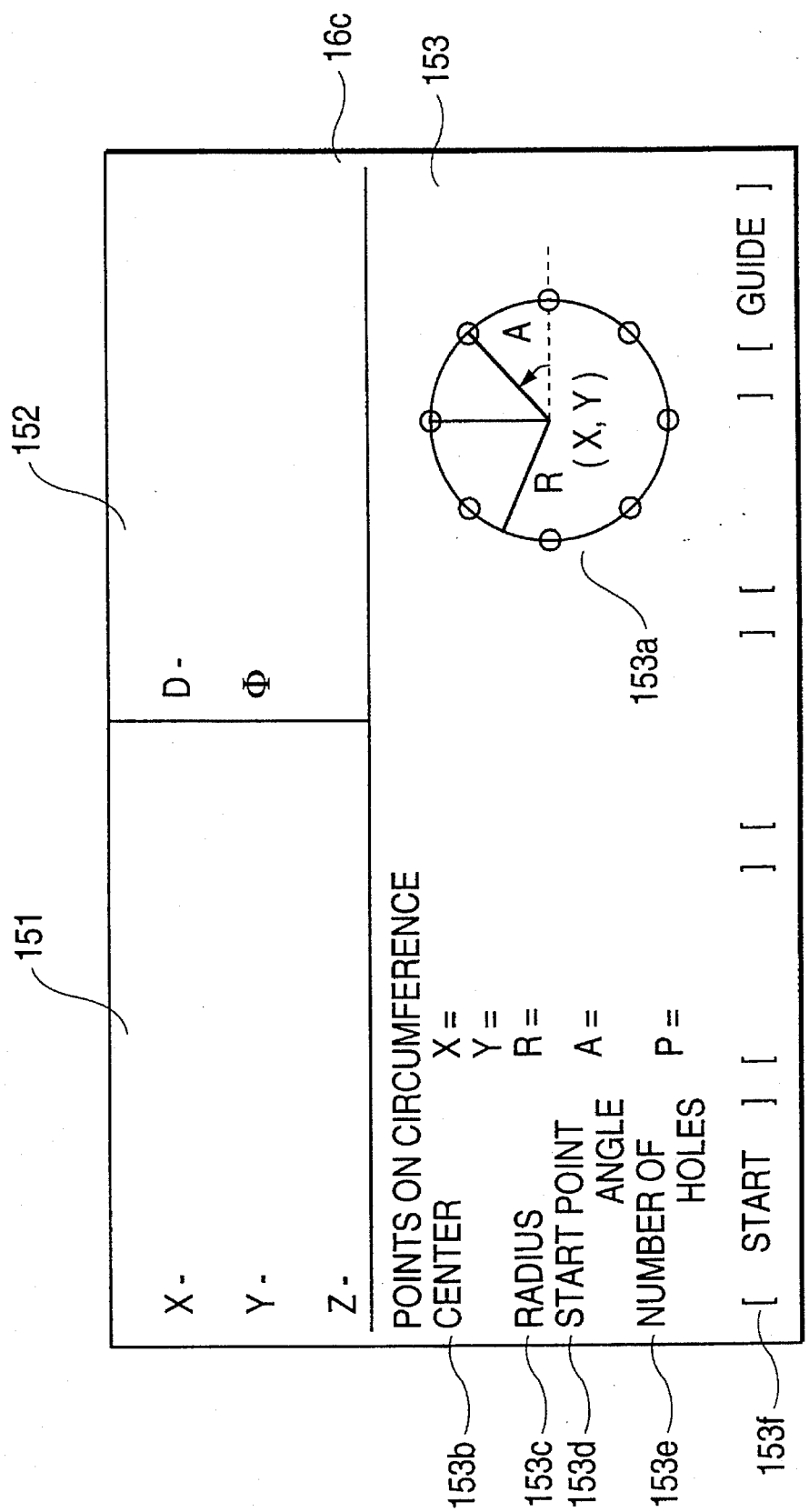
FIG. 8 is a view showing a guidance screen display image for generating a point group pattern.

FIG. 8 is a view showing a guidance screen display image for generating a point group pattern. When the point group pattern on the circumference is selected on the guidance selection screen display image shown in FIG. 7, the guidance screen display image 16c shown in FIG. 8 is displayed.

The guidance screen display image 16c includes a present position display column 151 in its upper left area for displaying the present position of the tool, a tool status display column 152 in its upper right area for displaying the current status and the like of the tool, and a data entering image 153 in its lower area for entering point group data. The present position display column 151 includes an X-coordinate column, a Y-coordinate column, and a Z-coordinate column as indicating the present position of the tool. The tool status display column 152 includes a distance display column for indicating the distance (D) between the tool and the designated shape, and a tool diameter display column for indicating the tool diameter ($\phi$).

The data entering image 153 displays in its right area a point group pattern status diagram 153a for the point group pattern on the circumference. The point group pattern on the circumference is determined by the elements of a circle center (X, Y), a radius R, a starting point angle A, and the number P of holes. The starting point angle A is an angle on the circumference of the position where the first hole is to be drilled, and is defined with respect to a line parallel to the X-axis at 0°. The positions of P holes are arranged at equal distances on the circumference.

The data entering image 153 displays in its left area a center (X, Y) entering column 153b, a radius R entering column 153c, a starting point angle A entering column 153d, and a hole number P entering column 153e, which correspond respectively to the elements for determining the point group pattern. In addition to the above data entering columns, the data entering image 153 displays a software key menu column 153f. When data in the data entering columns are entered, point group data are generated, and stored in the point group data memory means 1a.

When the operator presses a function key on the keyboard 17 which corresponds to [START] in the software key menu column 153f, the tool moves to a position where it will start drilling the workpiece. The tool is moved upon operation by the operator of the manual pulse generator 41, the jog feed buttons 42, or the cycle start button 45. When the tool reaches the position to start machining the workpiece, the tool stops. In that position, the operator manually operates a drilling machine, for example, to drill the workpiece. When the drilling at this position is finished, the operator operates again the manual pulse generator 41, the jog feed buttons 42, or the cycle start button 45, and the tool moves to a next machining position. When the tool reaches the next machining position, the tool stops. This operation is repeated successively at the respective positions of the point group data for completing the drilling process with respect to the point group pattern.

As described above, the tool moves successively to next drilling positions according to the point group data that have been generated on the guidance screen display image. Therefore, even if a general-purpose machine tool is used to drill a workpiece at a group of points, the tool can simply and accurately be moved to each of the points.

The generation of a group of points on a circumference has been described above. However, the generation of other point group patterns can be effected in the same manner as described above.

In the second embodiment, when machining at one point of point group data is finished, the tool moves to a next point and stops according to the operation of the operator. Such a process is repeated to machine the workpiece with respect to all the points of the point group data. Consequently, even if a general-purpose machine tool is used to machine a workpiece at a group of points, it is possible to move the tool simply and accurately to each of the points.

While the drilling process has been described above, the present invention is also applicable to other machining processes such as a cutting process. In such a case, when cutting is finished at each machining position, the tool moves to and stops at a next machining position.

Though the above embodiment has been described with respect to a drilling machine, the present invention is also applicable to other machine tools such as a lathe or the like.

The above guidance function may be incorporated in an ordinary numerical control apparatus, or may be arranged as an especially inexpensive numerical control apparatus.

According to the second embodiment, as described above, the tool is moved to and stopped at a next point when machining at one point of point group data is finished. The workpiece can be machined with respect to all the points of the point group data by repeating the above process. Thus, even if a general-purpose machine tool is used to machine a workpiece at a group of points, it is possible to move the tool simply and accurately to each of the points.

A third embodiment for continuously machining a workpiece to an entire designated machining shape will be described below. The hardware of a numerical control apparatus in the third embodiment is the same as that of the first embodiment (FIG. 2).

A procedure for generating a machining shape according to a numerical control process according to the present invention will be described with reference to FIGS. 9 and 10.

Figure 9:
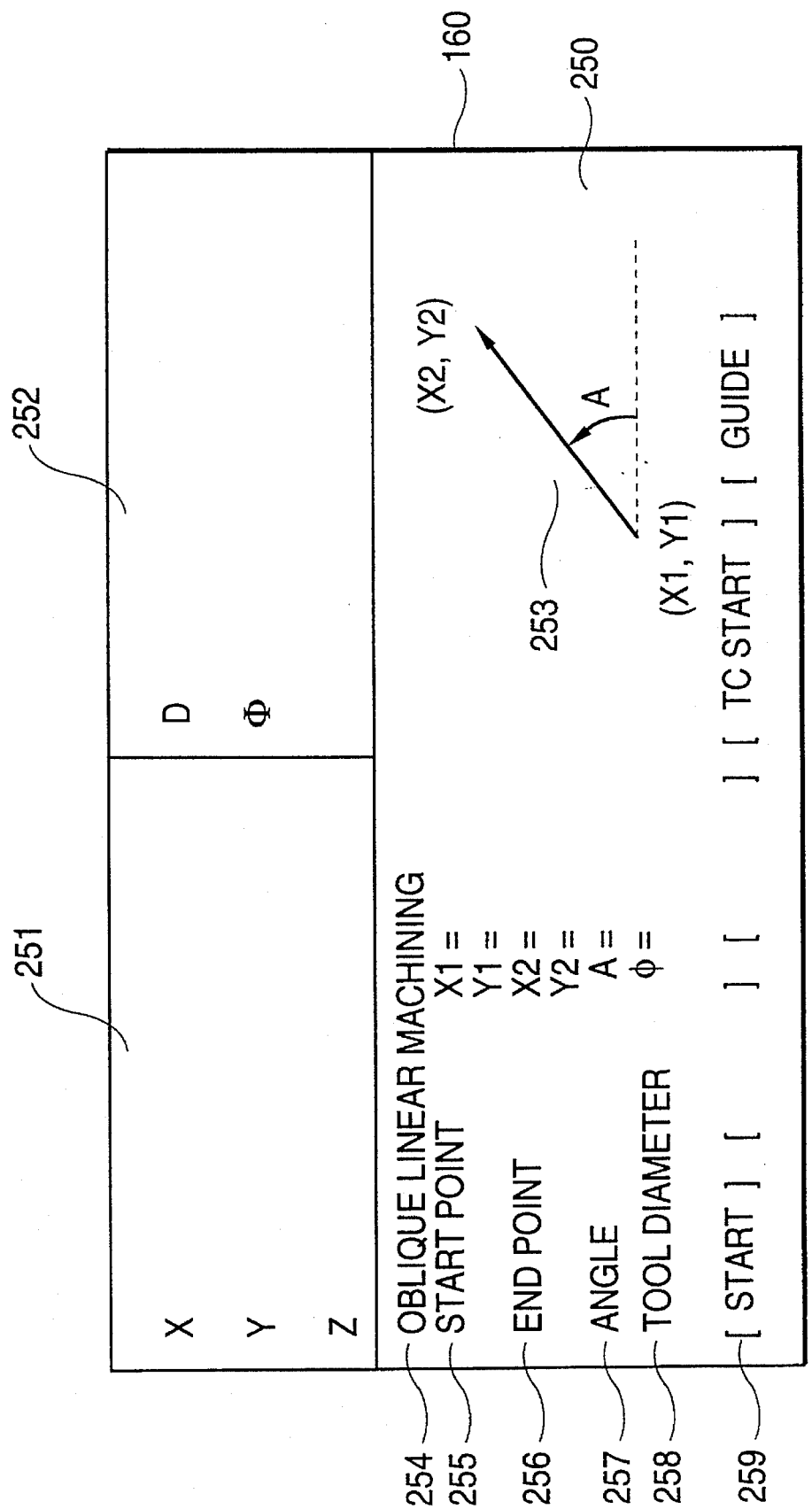
FIG. 9 is a view showing a guidance screen display image for generating a machining shape.

FIG. 9 is a view showing a guidance screen display image for generating a machining shape. When the operator selects oblique linear machining from a machining guidance menu image which is displayed, a guidance screen display image 160 is displayed on the display unit 16 (FIG. 2) of the numerical control apparatus. The machining guidance menu image displays, other than oblique linear machining, arcuate machining, full-circle machining, corner R machining, corner C machining, planar machining, pocket machining, etc. The operator selects a menu indicative of a shape to be designated (an oblique linear shape in this embodiment) from the machining guidance menu image.

The guidance screen display image 160 includes a present position display column 251 in its upper left area for displaying the present position of the tool, a tool status display column 252 in its upper right area for displaying the current status and the like of the tool, and a data entering image 250 in its lower area for entering graphic data. The present position display column 251 includes an X-coordinate column, a Y-coordinate column, and a Z-coordinate column as indicating the present position of the tool. The tool status display column 252 includes a distance display column for indicating the distance (D) between the tool and the designated shape, and a tool diameter display column for indicating the tool diameter (φ).

The data entering image 250 displays in its right area an oblique straight line 253 which is a designated shape. The oblique straight line 253 is determined by a starting point (X1, Y1), an ending point (X2, Y2), and an angle A.

The data entering image 250 displays in its left area OBLIQUE LINEAR MACHINGING 254 indicative of oblique linear machining, and including a starting point entering column 255, an ending point entering column 256, and an angle entering column 257. In addition to these data entering columns, the data entering image 250 includes a tool diameter (φ) entering column 258 and a software key menu column 259. In the software key menu column 259, when a function key on the keyboard 17 (FIG. 2) is pressed, a corresponding menu mode is initiated, changing the screen display image.

When the guidance screen display image 160 is displayed, the operator first selects a mode of [TC START] in the software key menu column 259, entering a teaching mode for the generation of a machining shape. At this time, the data entering image 250 displays "OBLIQUE LINEAR MACHINING" and "TEACHING" on its uppermost line. At the same time, the displayed [TC START] in the software key menu column 259 changes to [TC END].

In the guidance screen display image 160, when the operator enters data in each of the data entering columns, a designated shape for an oblique straight line is generated. Then, the operator operates the manual pulse generator 41 or the like to move the tool to an end point position on the designated shape. When the tool reaches the end point position, the operator turns on a teaching button 47 (FIG. 12), described later on, on the machine control console 40, storing the tool end point position and the shape and type of a machining path at the time.

If a shape following the oblique straight line in the entire machining shape is a corner R shape, for example, then the operator selects the menu of the corner R shape from the machining guidance menu image, and generates a designated shape for a corner R shape and registers an end point position and shape and type through a teaching process. Since the end point of the preceding designated shape becomes the start point of the new designated shape, partial designated shapes are joined for thereby generating a continuous machining path.

The above teaching process is carried out for the entire machining shape. When the operator finally selects a mode of [TC END] in the software key menu column 259, the final machining shape is generated, and its information is stored as an NC command statement. If the operator wants to confirm the machining shape at any point of time before the final machining shape is generated, then the operator may selects a mode of [CONFIRM] in the software key menu column 259. In the mode of [CONFIRM], the machining shape generated up to that point of time is displayed as a screen display image.

Finally, a playback function to be performed when a workpiece is machined along a final machining shape will be described below.

Figure 10:
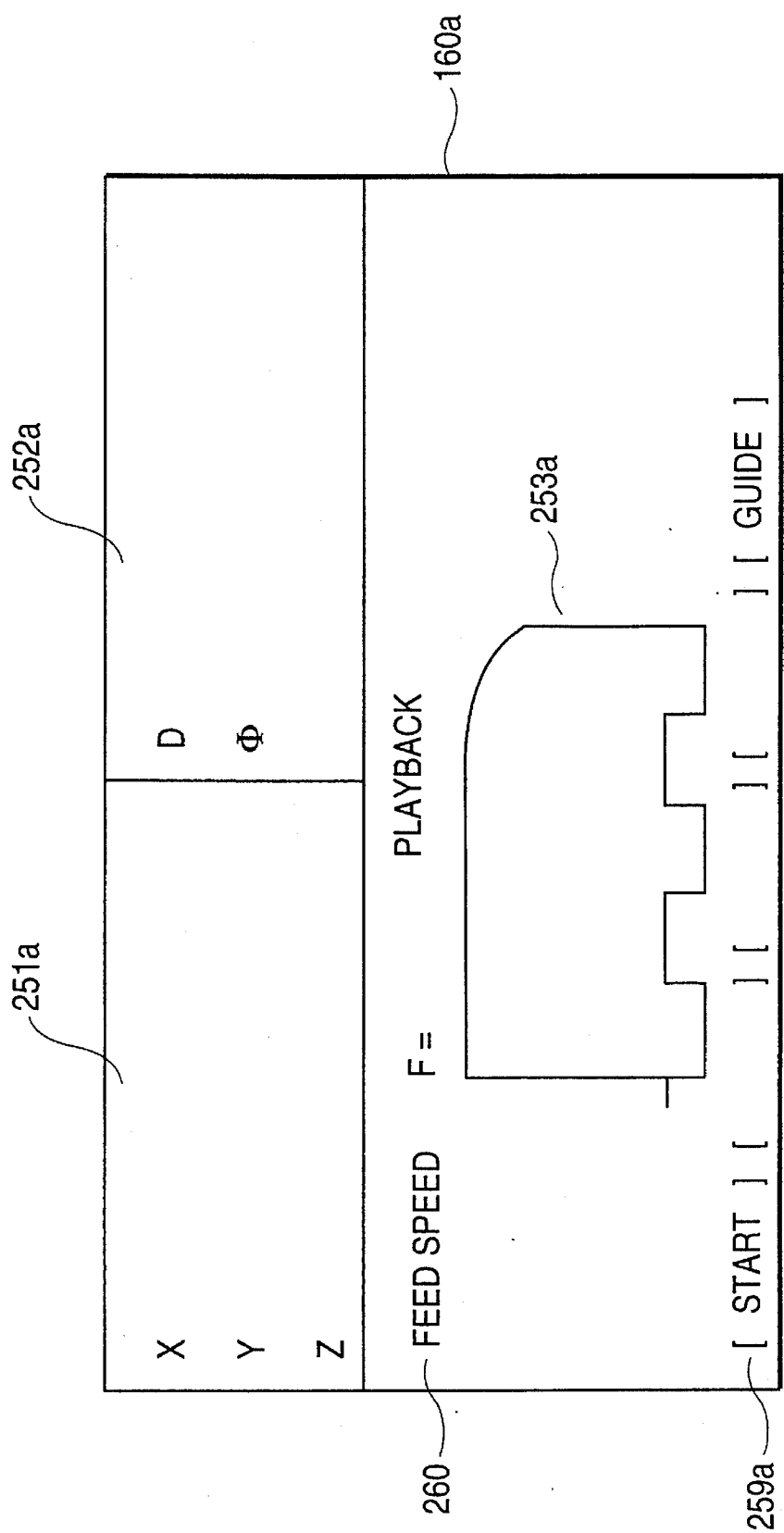
FIG. 10 is a view illustrative of a playback function for machining a workpiece along a final machining shape.

FIG. 10 is a view illustrative of a playback function for machining a workpiece along a final machining shape. The playback function is a function to machine a workpiece along a final machining shape that is generated using the above teaching function.

When the operator presses a playback button 46 (FIG. 12), described later on, on the machine control console 40, a playback screen display image 160a is displayed. The playback screen display image 160a includes in its central area a final machining shape 253a that is generated using the above teaching function. When the operator operates the manual pulse generator 41 or presses a jog feed button 42, the tool effects guidance machining along the final machining shape 253a.

For automatically effecting guidance machining, the operator enters, in advance, a feed speed in a feed speed F entering column 260 on the playback screen display image 160a. In this manner, a feed speed in an automatic operation mode is determined. When the operator then presses the cycle start button 45 (FIG. 12) on the machine control console 40, the tool automatically moves along the final machining shape 253a to effect guidance machining in response to a turning-on signal from the cycle start button 45.

Figure 12:
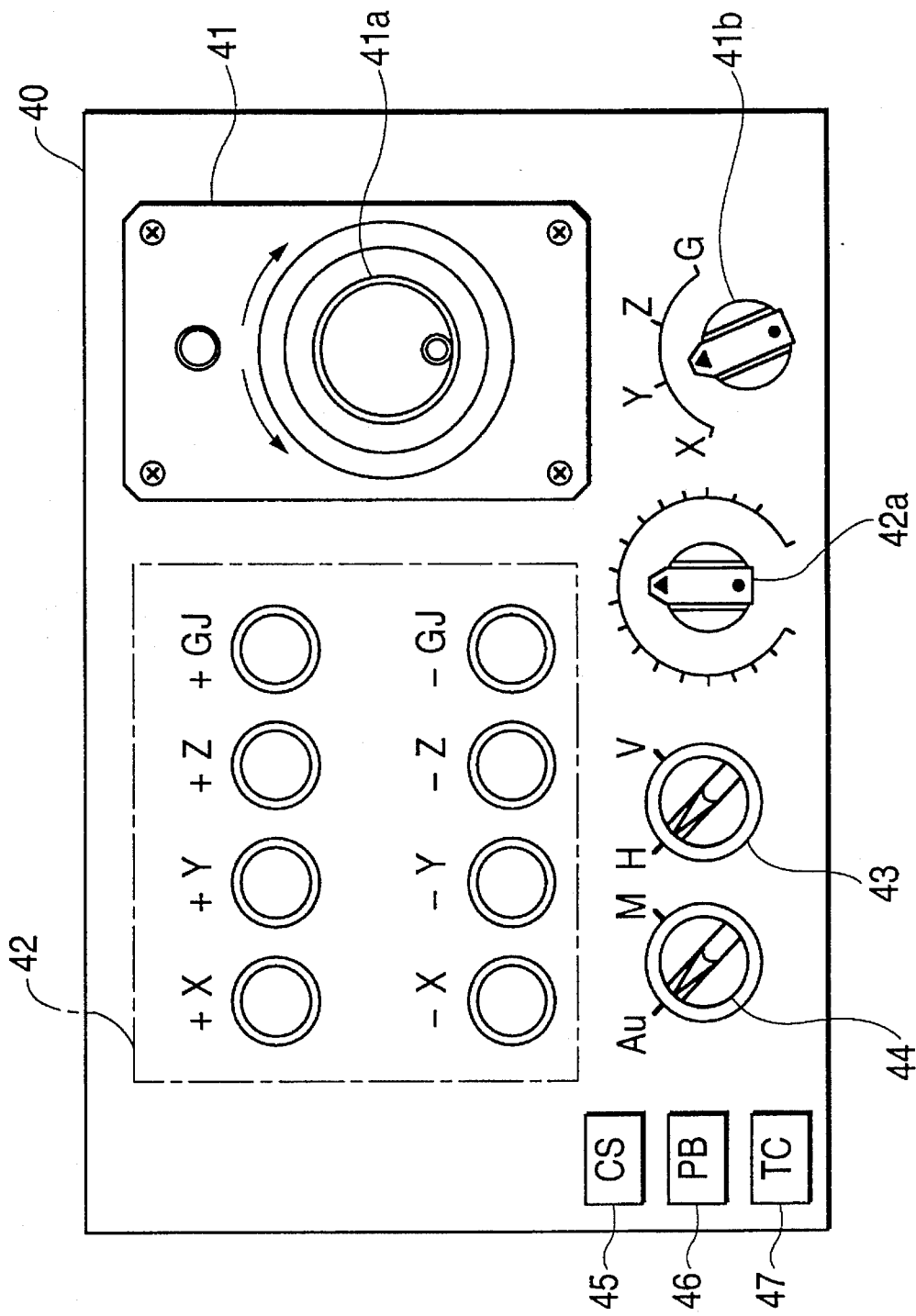
FIG. 12 is a view showing a machine control console by way of example.

The playback function is performed each time the operator presses the playback button 46 (FIG. 12). Therefore, it is possible to machine a plurality of workpieces to the same shape.

In the third embodiment, as described above, partial designated shapes are joined into a final machining shape by the teaching function, and the workpiece can be machined along the final machining shape by the playback function. That is, it is possible to machine the workpiece continuously along the entire machining shape. Since the final machining shape is stored, a plurality of workpieces can be machined to the same shape.

Figure 11:
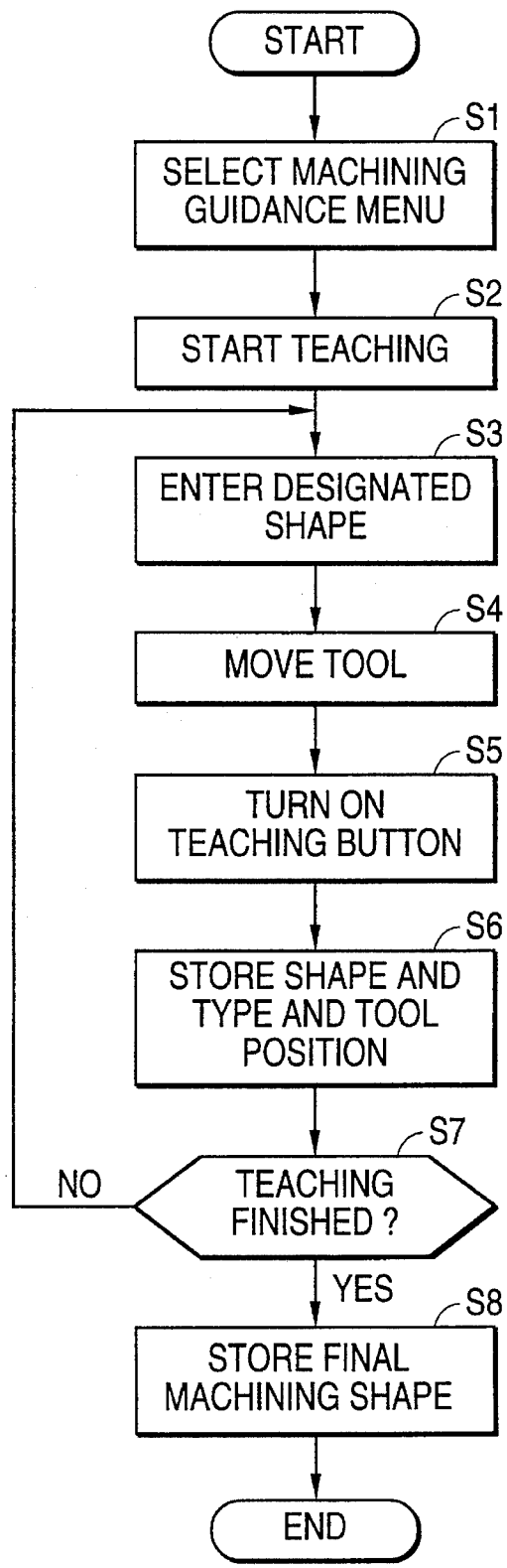
FIG. 11 is a flowchart of a processing sequence of a third embodiment of the present invention.

FIG. 11 shows a processing sequence of the third embodiment of the present invention. In FIG. 11, each numeral following the letter "S" represents a step number.

[S1] First, a machining guidance menu is selected.

[S2] The numerical control apparatus enters a teaching mode when [TEACHING START] in the software key menu column is selected.

[S3] A designated shape is entered according to a guidance screen display image.

[S4] The manual pulse generator or the like is operated to move the tool.

[S5] The tool is set to the end point position of the designated shape, and the teaching button is turned on.

[S6] In response to a turning-on signal from the teaching button, the tool position and the shape and type of a machining path are stored.

[S7] Whether the teaching process is finished or not is determined. If finished, then control proceeds to a next step S8. If not, then control returns to the step S3.

[S8] A final machining shape is stored as NC command statement by selecting [TEACHING END] in the software key menu column.

FIG. 12 is a view showing the machine control console on the machine tool by way of example. The machine control console 40 shown in FIG. 12 has the manual pulse generator 41, the selector switch 41b, the jog feed buttons 42, the setting switch 42a, the direction changing switch 43, the operation changing switch 44, the cycle start button 45, the playback button 46, and the teaching button 47.

When a handle 41a is turned to the left or right, the manual pulse generator 41 generates a pulse signal depending on the rotation of the handle 41a. The pulse signal, which is composed of two-phase pulses for determining the direction in which the handle 41a is turned, is sent through the bus 30 to the processor 11 for moving the tool.

The selector switch 41b is a switch for selecting a pulse signal generated by the manual pulse generator 41 in either an X-axis direction (X), a Y-axis direction (Y), a Z-axis direction (Z), or a direction (G) which corresponds to the cyclic machining path in the graphic data. When the manual pulse generator 41 is operated to move the tool along the final machining shape, the selector switch 41b is set to "G".

The jog feed buttons 42 comprise a total of 8 buttons including positive and negative feed buttons "+X", "−X", "+Y", "−Y", "+Z", and "−Z" for the respective axes, and positive and negative feed buttons "+GJ", "−GJ" corresponding to the path in the point group data. When the tool movement along the final machining shape is to be effected by operating a jog feed button 42, the feed button "+GJ" is used. A turning-on signal produced when this jog feed button 42 is pressed is sent through the PMC 22 and the bus 30 to the processor 11.

The setting switch 42a sets the number of pulses in a certain period of time which are generated when the jog feed buttons 42 are pressed. As with the turning-on signal from the jog feed buttons 42, the set signal SS produced by the setting switch 42a is sent through the PMC 22 and the bus 30 to the processor 11.

The direction changing switch 43 is a switch for selecting whether the tool is to be moved parallel to a designated shape generated according to the guidance information or to be moved perpendicularly to the designated shape, when "G" is selected by the selector switch 41b and the manual pulse generator 41 is operated. When the direction changing switch 43 is set to "H", the tool moves parallel to the designated shape. When the direction changing switch 43 is set to "V", the tool moves perpendicularly to the designated shape.

The operation changing switch 44 is a switch for selecting whether the tool movement along the final machining shape is to be effected manually or automatically. When the operation changing switch 44 is set to "M", the tool moves manually. When the operation changing switch 44 is set to "Au", the tool moves automatically according to the feed speed command F.

The cycle start button 45 is a switch for starting an automatic feed while the operation changing switch 44 is being set to "Au". Specifically, when the cycle start button 45 is pressed, the tool is automatically moved along the final machining shape.

The playback button 46 is a button for performing the playback function. When the playback button 46 is pressed, the final machining shape is displayed as a playback screen display image as described above.

The teaching button 47 is a button for performing the teaching function. When the teaching button 47 is pressed, the tool position at the time is stored, and designated shapes are joined.

In the third embodiment, as described above, partial designated shapes are joined into a final machining shape by the teaching function, and the workpiece is machined along the final machining shape by the playback function. Therefore, it is possible to machine the workpiece continuously along the entire machining shape. Since the final machining shape is stored, a plurality of workpieces can be machined to the same shape.

According to the third embodiment, a designated shape is generated on the basis of information that has been entered in an interactive manner by the operator according to guidance information, then partial designated shapes are joined into a final machining shape by the teaching function, and the workpiece is machined along the final machining shape by the playback function.

Consequently, when the operator operates the manual pulse generator or the like, the tool can be fed continuously along the final machining shape. Therefore, the workpiece can be machined continuously along the entire machining shape.

A plurality of workpieces can be machined to the same shape as the final machining shape is stored.

A numerical control apparatus may be arranged so as to include all or some of the embodiments described above.

The present invention is not limited to the above embodiments, but various changes and modifications may be made therein without departing from the scope of the invention.

We claim:

1. A numerical control apparatus for controlling a machine tool having at least two axes, comprising:

graphic data memory means for storing graphic data for cyclic machining entered in an interactive fashion according to guidance information;

converting means for calculating a machining path for cyclically machining a workpiece based on said graphic data and converting said machining path into NC commands;

NC command memory means for storing said NC commands;

movement command means for outputting an output pulse signal to command movement of said machine tool, said movement command means including a manual pulse generator, a jog feed button, an automatic feed speed command preset together with said graphic data, and selecting means for selecting one of a pulse signal generated from said manual pulse generator, a pulse signal produced by said jog feed button, and a feed speed command pulse signal generated based on said automatic feed speed command and for outputting said selection as said output pulse signal; and interpolating means for outputting an interpolated pulse signal to move said machine tool along said machining path based on said output pulse signal outputted from said movement command means and said stored NC commands.

2. A numerical control apparatus for controlling a machine tool having at least two axes, comprising:

point group data memory means for storing point group data entered in an interactive fashion according to guidance information;

converting means for converting said point group data into NC commands;

NC command memory means for storing said NC commands;

movement command means for outputting an output pulse signal to command movement of said machine tool, said movement command means including a manual pulse generator, a jog feed button, a feed speed command preset together with said point group data, and selecting means for selecting one of a pulse signal generated from said manual pulse generator, a pulse signal produced by said jog feed button, and a feed speed command pulse signal generated based on said feed speed command and for outputting said selection as said output pulse signal; and interpolating means for interpolating said output pulse signal to move said machine tool to a next point designated by said NC commands when machining of the workpiece at one point of said point group data is completed, and outputting an interpolated pulse signal.

3. A numerical control method of controlling a machine tool having at least two axes, comprising the steps of:

(a) generating a designated shape of an entire machining shape based on information entered in an interactive fashion according to guidance information;

(b) moving said machine tool to an end point position of said designated shape;

(c) activating a teaching button;

(d) storing said end point position and said designated shape;

(e) repeating steps (a)–(d) for each designated shape of said entire machining shape;

(f) generating a final machining shape by joining said designated shapes at said end point positions;

(g) generating a pulse signal from one of a manual pulse generator, a jog feed button, and a preset feed speed command; and (h) continuously guiding said machine tool along said final machining shape based on said pulse signal.

* * * * *

UNITED STATES PATENT AND TRADEMARK OFFICE
CERTIFICATE OF CORRECTION

PATENT NO.   : 5,493,193
DATED        : February 20, 1996
INVENTOR(S)  : Masaki SEKI et al.

It is certified that error appears in the above-indentified patent and that said Letters Patent is hereby corrected as shown below:

Column 1, line 13, delete "2. Background Art" and insert –2. Description of the Related Art–.

Signed and Sealed this

Fourteenth Day of May, 1996

Attest:

BRUCE LEHMAN

*Attesting Officer*   *Commissioner of Patents and Trademarks*